UNITED STATES PATENT OFFICE.

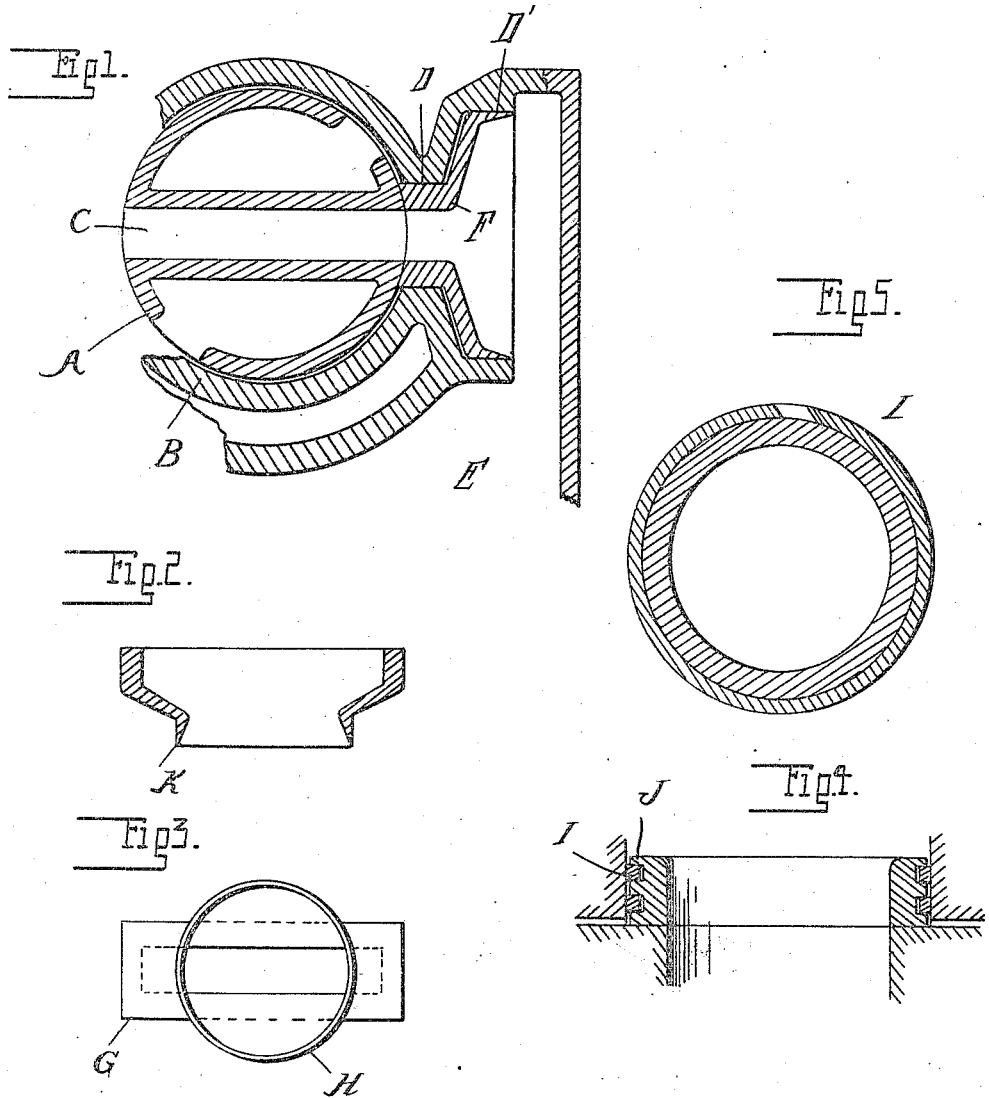

NATHANIEL B. WALES, OF BOSTON, MASSACHUSETTS, ASSIGNOR, BY MESNE ASSIGNMENTS, TO SELAW PRODUCTS COMPANY, OF SAGINAW, MICHIGAN, A CORPORATION OF MICHIGAN.

SEALING MEANS FOR ENGINE-VALVES.

1,189,757.      Specification of Letters Patent.      Patented July 4, 1916.

Application filed April 5, 1912.    Serial No. 688,638.

*To all whom it may concern:*

Be it known that I, NATHANIEL B. WALES, a citizen of the United States of America, residing at Boston, in the county of Suffolk and State of Massachusetts, have invented certain new and useful Improvements in Pneumatically-Operated Sealing Means for Explosion-Engine Valves, of which the following is a specification, reference being had therein to the accompanying drawings.

The invention relates to explosion engines of that type in which sliding or rotary valves are used in distinction from the puppet type of valve. Certain advantages of the rotary or sliding type of valve over the puppet valve have long been recognized, but on account of inherent defects of construction as usually applied to explosion engines, rotary or sliding valves have been found unsuccessful if not entirely inoperative. One of the chief defects is the difficulty of maintaining an effective seal and consequently rotary valve explosion engines are lacking in power and efficiency. The present invention is designed to overcome this defect by providing pneumatically operated sealing means which will be automatically adjusted to compensate for wear and which avoids the necessity of accurate machining of the parts and the making of close fits.

Broadly considered the invention comprises a ported shoe which is fitted to and in contact with the valve face, said shoe being located in a recess in the valve case and having a gas-tight sealing engagement therewith. Thus the gaseous pressure of explosion or compression within the engine cylinder operating upon said shoe will hold the same in sealing contact with the valve and will maintain the pressure without regard to the amount of clearance between the valve and its case.

A further feature of the invention is the proportioning of the surfaces of said shoe that respectively bear against the valve and are exposed to the gaseous pressure so that there is a predetermined differential in favor of the pressure forcing the shoe against the valve. This proportioning of the surfaces avoids excessive pressure against the valve, thereby limiting wear and lessening frictional resistance.

Still another feature of the invention is the formation of the shoe with a valve bearing portion conforming to the desired valve port and a case bearing portion of circular or cylindrical form thereby facilitating the sealing between the shoe and the case.

My invention may be applied to various specific constructions but as shown, in the drawings, Figure 1 is a cross section through a portion of an explosion engine cylinder having a rotary valve provided with my improved sealing means; Fig. 2 is a longitudinal section through the sealing means; Fig. 3 is an elevation of the sealing ring shown in Fig. 1 detached; Fig. 1 is a section through a modified construction; and Fig. 5 is a horizontal section therethrough.

A is the valve face which in the construction shown in Fig. 1 is of cylindrical form, B is the case for the valve which may either loosely fit the face thereof, or if desired may be made with a clearance so as to be at all times out of contact with said face, C is the valve port and D is a port or passage in the case with which said valve port is adapted to register and which is in constant communication with the explosion chamber E.

F is the pneumatically operated sealing means which in the construction shown in Figs. 1 to 3 inclusive is in the form of a ported shoe or ring having an elongated portion G which corresponds to the shape of the port C in the valve and is of a size to form a marginal bearing about said port upon the valve face. The member F is also provided with a portion H of circular or cylindrical form and which merges into the form of the portion G. The portion G slidably engages a correspondingly formed portion of the port D in the valve case, while the portion H engages a cylindrical portion D' in the case. The port area in these two portions is preferably equal and the area exposed to the gaseous pressure operating to force the shoe toward the valve, is also proportioned to the area which is bearing against the valve face. This face bearing area by reason of the pressure exerted upon the oil film between the valve face and the shoe, will actuate the latter in a direction counter to the pressure on the exposed area and therefore, by properly proportioning these two areas any desired differential may be obtained.

To prevent leakage around the outside of the shoe between the same and the case, external sealing means may be provided. In Figs. 4 and 5 I have shown a packing ring construction comprising the split rings engaging a groove in the circular portion J of the shoe. In Figs. 1, 2 and 3 a different construction is used in which the cylindrical portion H is tapered down on the inside to form a thin wall or feather edge K. By reason of this thinning of the wall the gaseous pressure of explosion will cause a slight expansion which will press the feather edge in close contact with the wall of the cylindrical recess D' and will effectually prevent leakage of the gas. This specific form of sealing means is not however my invention.

The change in form of the member F from the elongated portion G to the circular or cylindrical portion H is an important feature of the invention, particularly where a rotary cylindrical valve is used. Thus with such a construction of valve in order to secure the proper port area and also to obtain the desired time of the valve in opening and closing its ports, it is necessary to form comparatively narrow and long ports. If such a form were maintained it would be extremely difficult to seal between the shoe and the case as an elongated form is not adapted for use with either of the sealing means shown in Figs. 1 and 4. Where however, the elongated form of the valve bearing portion is changed to the circular or cylindrical form as shown the latter may be used with any suitable sealing means such as a ring or the feather edge.

The importance of my invention as applied to the valves of explosion engines will be appreciated when it is considered that the maintenance of an effective seal in the valve is one of the chief factors in determining the power and efficiency of the engine. Furthermore, my improvement is exceedingly simple and inexpensive to manufacture and dispenses with all necessity for close fits and accurate machining of the valve and its case.

What I claim as my invention is:

1. The combination with a ported valve and an apertured case, of a sealing member therebetween having an area in contact with the valve face which is in excess of the area directly exposed to the pressure in the case and is proportioned thereto to form a substantial balance, with a preponderance of pressure for holding said member against the valve face.

2. The combination with a ported valve and an apertured case, of a member having an adjustable sealing engagement with the aperture in said case and provided with a face bearing against the face of the valve, the area thereof being in excess of the area directly exposed to the pressure in the case and being so proportioned as to substantially balance the pressures with a slight preponderance for holding said member against the valve face.

3. The combination with a ported valve and an apertured case, of an annular member having a slidable sealing contact with the walls of the aperture in said case and provided with a face of greater dimensions than said aperture bearing against said ported valve face, the area of said bearing face being so proportioned to the area directly exposed to the pressure within said case as to obtain a substantial balance, with a preponderance of pressure for holding said member against the valve face.

4. The combination with a ported valve and an apertured case, of a member adjustably engaging the aperture in said case, having a portion surrounding the port in said valve and bearing against the face of the latter, the areas on said member respectively bearing against the valve face and exposed to the direct pressure within the case, being proportioned to produce opposed pressures having a predetermined preponderance for holding said member to the valve face.

5. The combination with a ported valve and a ported case, of a member adjustably engaging the aperture in said case having a port corresponding to said valve port, and a bearing portion for engaging the valve face completely surrounding said port, the area of said bearing portion being proportioned to the area of said member exposed to opposed pressure to obtain a slight differential pressure for holding said member against the valve.

6. The combination with two relatively movable members provided with registerable ports, of a sealing means comprising an annular member engaging one of said ports having a bearing face surrounding the port in the other member, and sealing means between said member and the port in which it is located, the area of the bearing portion of said member being proportioned to the exposed area to partially balance the pressure on the latter but with a slight differential for holding said bearing area against the other member.

7. The combination with a ported valve and a ported seat having a clearance therebetween, of a sealing ring surrounding the port of one of said members and bearing against the face of the other member, said ring being exposed to opposed pressures to partially balance the same with a differential for holding it in contact with the face of the relatively movable member.

In testimony whereof I affix my signature in presence of two witnesses.

NATHANIEL B. WALES.

Witnesses:
JAMES P. BARRY,
DELBERT COLLINS.